United States Patent [19]

Planeta

[11] Patent Number: 4,533,309
[45] Date of Patent: Aug. 6, 1985

[54] COLLAPSING FRAME FOR MOVING TUBES OF PLASTIC MATERIAL

[76] Inventor: Mirek Planeta, 5396 Windermere Dr., Burlington, Ontario, Canada, L5L 3M5

[21] Appl. No.: 504,570

[22] Filed: Jun. 15, 1983

[51] Int. Cl.³ .............................................. B29C 15/00
[52] U.S. Cl. .................. 425/326.1; 264/566; 425/387.1
[58] Field of Search .................. 425/326.1, 72 R, 325, 425/387.1; 264/564, 565, 566

[56] References Cited

U.S. PATENT DOCUMENTS

| | | | |
|---|---|---|---|
| 2,916,764 | 12/1959 | Gerber | 425/326.1 |
| 3,223,762 | 12/1965 | Fry, Jr. | 264/564 |
| 3,258,516 | 6/1966 | Ewing, Jr. | 264/563 |
| 3,335,208 | 8/1967 | Harris | 264/566 |
| 3,596,321 | 8/1971 | Upmeier | 425/326.1 |
| 3,768,949 | 10/1973 | Upmeier | 264/564 |
| 3,930,781 | 1/1976 | Upmeier | 425/326.1 |
| 3,980,418 | 9/1976 | Schott, Jr. | 425/326.1 |
| 4,170,624 | 10/1979 | Dawson | 264/564 |
| 4,388,061 | 6/1983 | Bebok | 425/326.1 |

*Primary Examiner*—Jeffery Thurlow
*Attorney, Agent, or Firm*—Hirons, Rogers & Scott

[57] ABSTRACT

A collapsing frame for collapsing an extruded tube of plastics material to flattened form employs two converging frame members each having a large number of parallel rows of rollers mounted with their axes of rotation transverse to the direction of movement of the tube. Each row consists of a large number of small diameter, short length rollers of low density material mounted closely side-by-side to provide a continuous engagement surface, but freely rotatable independently of one another on the common axle. The rollers are of low friction, high temperature resistance material such as polytetrafluorethylene or nylon. The new frame results in better surface appearance owing to absence of scratches and reduction of wrinkling, and better tracking of the tube through the frame. There is also an unexpected improvement in flatness believed due to better support of the tube. An unexpected increase is possible in the rate of extrusion and speed of movement of the tube, due partly to avoidance of jerking contact of the hot sticky film against the frame, but the increase obtained is not fully explainable by this and it is at present believed there is an increase in cooling of the tube, owing to the high heat exchange and air turbulence provided by the large number of individual spinning rollers.

5 Claims, 3 Drawing Figures

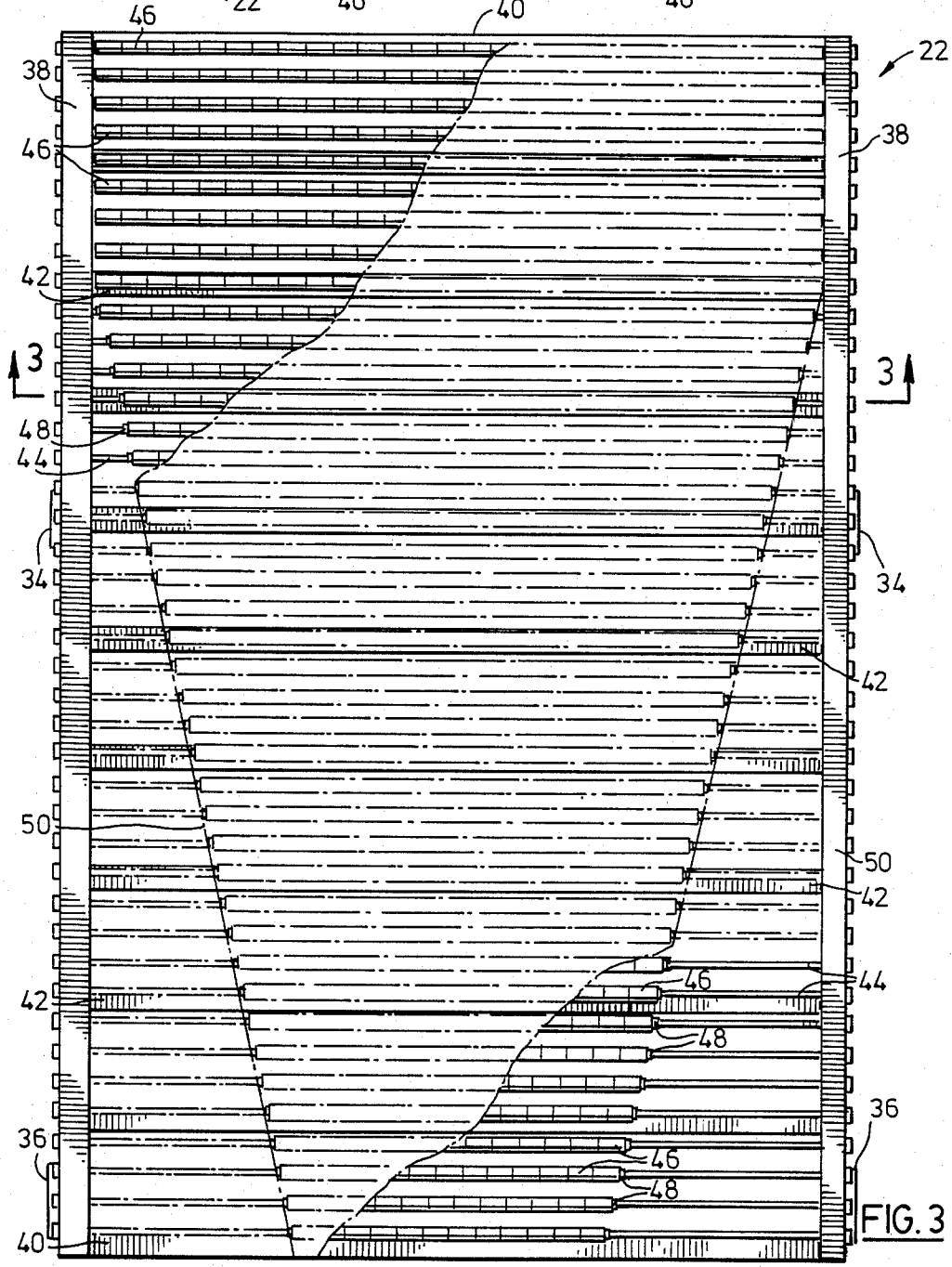

COLLAPSING FRAME FOR MOVING TUBES OF PLASTIC MATERIAL

FIELD OF THE INVENTION

The invention is concerned with improvements in or relating to collapsing frames that are employed to collapse a moving extruded tube to flattened form.

REVIEW OF THE PRIOR ART

It is now a mature art to produce thin plastic film by extruding a tube thereof from an annular orifice of a suitable die. Most usually the tube is expanded to a larger diameter, so as to produce thinner film, by feeding air under pressure to the interior of the tube. The cooled tube is collapsed to a flattened form to permit it to be conveniently handled further, for example, by feeding to a storage roll or to a bag-making machine. The tube usually is collapsed from its circular cross-section to the flattened form by a so-called collapsing frame disposed along the path of the tube, the frame consisting of two frame members that are inclined symmetrically and oppositely toward the tube to provide a progressively narrowing passage between them that finally delivers the collapsing tube into the nip of a pair of gathering rollers. The collapsing and gathering takes place against the internal air pressure which presses the film against the tube-engaging members of the frame.

Such frames employed hitherto employ either a series of rollers, each of which extends the width of the frame and is disposed with its axis parallel and transverse to the direction of movement of the film, or a series of stationary wooden slat members which contact the film. A number of problems are encountered with such frames.

For example, a frame employing a series of rollers involves difficulties because the thin easily damaged film must accelerate the rollers to their operative speed during start up. The length of the line of contact of each roller with the film can very considerably quite suddenly, but the linear speed of the film increases progressively along the said line from its centre outwards, so that different parts of the film are attempting to drive the rollers at different speeds and some scrubbing must occur. If the contact length decreases suddenly then the momentum of the roller may be such that the narrower piece of film with which it retains contact is damaged. Because of these problems and there expense of production roller collapsing frames generally are used only where a wooden salt frame cannot be used, for example with particularly sticky films. Both types of frame tend to cause the production of an undesired amount of wrinkling of the film, or even scratches, as the hot, sticky film engages the frame members. It has also been found that by comparison with a collapsing frame of the invention they permit an undesirable amount of sag, resulting in film that is unacceptable because it is less flat than is required. It has also been found that the speed at which the tube can pass through the frame without jerking in its contact therewith has been a substantial factor in limiting the speed of operation of the entire installation, and replacement of such prior art collapsing frames with a frame of the invention can result in a substantial increase in the output.

DEFINITION OF THE INVENTION

In accordance with the invention there is provided a collapsing frame for collapsing a tube of plastic material from a tubular circular cross-section to a flattened form, the collapsing frame comprising:

two frame members each adapted to be disposed on a diametrically opposite side of the tube and converging toward one another in the direction of movement of the tube so as to collapse the tube upon movement of the tube in said direction of movement and engagement of the tube with the frame members, each frame member having mounted thereon for engagement with the tube a plurality of parallel rollers mounted for free rotation about parallel axes that are perpendicular to the direction of tube movement, the width of said parallel rollers increasing progressively and symmetrically about a centre line in said direction of tube movement, so as to progressively contact a larger surface portion of the tube as it moves between the converging frame and guide the tube until its width is defined by the width of the frame, each rollers comprising a plurality of independently rotatable rollers mounted side-by-side with one another to provide a substantially continuous surface of engagement with the tube, said independently rotatable rollers constituting means effective to permit said tube to have different speeds in the direction of movement of said tube and being of a material so as to provide a minimal coefficient of friction with said tube.

Preferably, the rollers are of diameter in the range 12.5 mm to 25 mm and are of length in the range of 12 mm to 5 cm. Also preferably the rollers are of a material of density from about 0.9 g per cc to about 1.7 g per cc, such as polytetrafluorethylene or nylon.

DESCRIPTION OF THE DRAWINGS

Particular preferred embodiments of the invention will now be described, by way of example, with reference to the accompanying diagrammatic drawings wherein:

FIG. 2 is a front elevation of one frame member of the frame to show detail of the construction thereof, and FIG. 3 is a cross-section to a larger scale through one frame member taken on the line 3—3 of FIG. 2.

DESCRIPTION OF THE PREFERRED EMBODIMENTS

Figure 1:
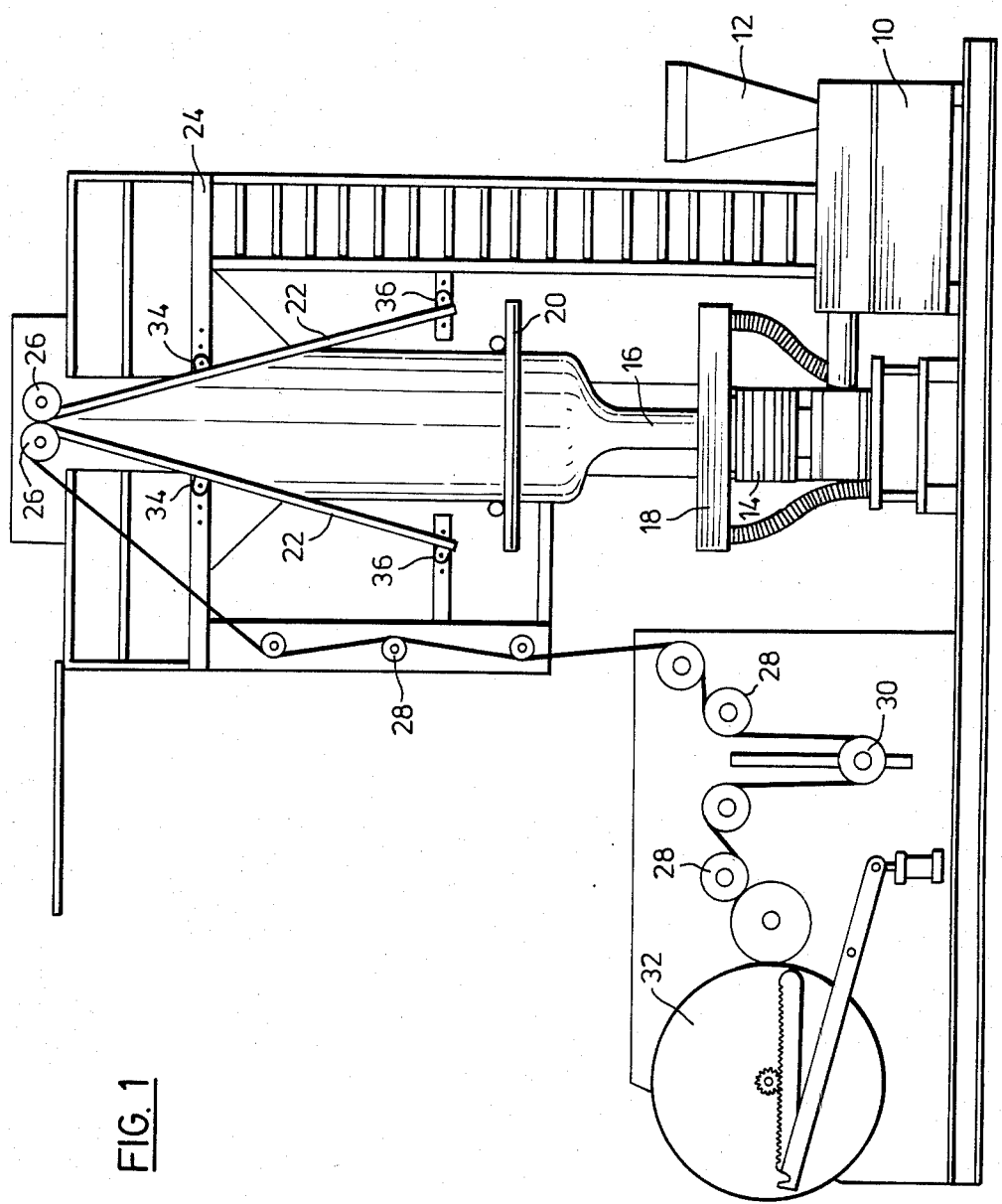
FIG. 1 is a side elevation of a complete installation employing a collapsing frame of the invention.

A collapsing frame of the invention typically is employed in an installation for the manufacture of thin plastic film by blowing an extruded tube thereof, as illustrated by FIG. 1, the installation consisting of an extruder 10, the hopper 12 of which is fed with the plastic material, usually in pellet form. The molten plastics material issuing from the extruder is fed to a die 14 having a circular annular orifice from which it emerges in the form of an upwardly-moving tube 16 of circular transverse cross-section. The tube is cooled by an annular blast of air delivered to its exterior surface by a surrounding air ring 18, and at the same time pressurized air is fed to its interior at a pressure sufficiently high to cause it to increase in diameter and produce much thinner film, the maximum diameter of the expanded tube being determined by the internal pressure and also by a sizing frame 20 surrounding the tube. At some location along its length indicated so-called "front line" the molten plastic solidifies and the upwardly-moving expanded tube is then progressively collapsed to the required flattened form by a collapsing frame constituted in this embodiment by two flat, rectangular frame members 22 adjustably mounted in a supporting gantry 24 on diametrically opposite sides of the tube so as to converge toward one another. The frame members are contacted by the moving tube and progressively flatten it and feed it into the nip of two driven opposed gathering rollers 26, which complete the collapsing and flattening step. The collapsed, flattened tube is then fed by a series of rollers 28 and a tensioning mechanism 30 to a storage roll 32.

Each flat, rectangular frame member 22 is mounted on the gantry 24 by upper and lower bracket members 34 and 36 respectively which permit adjustment of their relative inclination to one another; however, the frame is able to operate with a wide range of tube diameters once it has been placed in position on the gantry. Each frame member consists of tubular side members 38, end members 40 and reinforcing cross members 42 and supports along its length a large number of parallel rods 44, each of which comprises an axle for a corresponding large number of small diameter, short-length rollers 46 of a low density material mounted thereon for free rotation between axially movable end collars 48. The end collars 48 constrain the rollers to keep them closely side-by-side so that they present a substantially continuous engaging surface to the film, but are free to rotate freely independently of one another. At the lower ends of the frame members the rollers 46 are only able to engage a relatively small segment of the cylindrical periphery of the tube and therefore they are provided only at the corresponding central portions of the lower supporting axles. The number of rollers on successive axles increases progressively upwards in the direction of movement of the tube, the locations of the end collars 48 being indicated by the lines 50 in FIG. 4, until the axles at the top of the frame have the maximum possible number mounted thereon and they extend the full width of the frame. The rollers are of a material having a low coefficient of friction with the material of the film, and a particularly suitable material is a polytetrafluorethylene, which is also of low density and is relatively easily manufactured to the required form of small hollow rollers.

The employment of a collapsing frame of the invention in place of the frames used hitherto, such as a wooden slat frame, leads to a considerable improvement in the appearance of the flattened film, which exhibits much less wrinkling and an absence of the scratching that is caused by a wooden slat frame. Unexpectedly and more importantly it is found that the collapsed film is much flatter than hitherto, owing it is believed, to the better support of the film in the frame by the small multiple independently rotatable rollers. This improved flatness is particularly important for example with coextruded films which usually are used on high speed machines that require the use of sufficiently flat film. Also surprisingly it is found that the rate of extrusion from the die and accompanying speed of movement of the tube can be increased substantially, one of the reasons being that the film can be much hotter when it is contacted and collapsed by the frame. With a wooden slat frame the maximum speed at which the tube could be moved was limited to a value above which the still hot and sticky film began to jerk in its contact with the frame members to avoid the danger that the bubble would be torn and disrupted; this does not happen with the frame of the invention since the film is contacted by a plurality of low friction, freely rotating rollers. However, the improvement obtained is not fully explainable by this effect alone, and it is at present believed that it is also due to the unexpectedly efficient heat removal that is provided by the spinning rollers, which constantly present fresh effective heat transfer surface to the hot film, and also by their rotation produce a highly turbulent air flow over the remainder of their surfaces that is not contacted by the film, and also over the adjacent film surface, this turbulent flow being very effective in cooling both the film and roller surfaces.

The rollers are of relatively small diameter, are of low density material, and each is short, so that the inertia of each roller is correspondingly low during start up, while its momentum when spinning is also correspondingly low and will not damage the film. Adjacent rollers can rotate at different speeds so as to accomodate for the change of speed required across the width of the frame, and can also readily change in speed as the width of the film that is in contact with a row of rollers changes. The friction between the film and each roller is substantially higher parallel to its axis of rotation than in the direction of movement of the film, and is not reduced by sideway scrubbing movements of the film on the rollers, as with the prior art single rollers, so that the film "tracks" more positively with each of the small individual rollers, and is thereby held more stably in the frame against transverse movement, so that again uneven gauge, marking and damage to the film is avoided.

As will be understood by those skilled in the art, the sizes of collapsing frames can vary widely, from as narrow as 30 cm (12 inches) to as wide as over 6 meters (20 feet), although the usual range is from 1.5 to 3 meters (5 to 10 feet). The rollers should be in the range of diameter 12.5–25 mm (0.5–1 inch) with a preferred diameter of about 16 mm (0.625 inch), and conveniently will be mounted on a steel rod axle of about 6 mm (0.25 inch) diameter; the axles are spaced about 3 to 4 cm (1.2 to 1.6 inches) apart in the direction of tube movement. If such an axle longer than about 1.2 meter (4 feet) then intermediate supports should be provided to prevent sag, and a corresponding number of coaxial axles employed. The length of the rollers should be in the range 12 mm–5.0 cm (0.5–2 inches) with a preferred length of 25 mm (1 inch). As stated above the preferred material is a polytetrafluorethylene because of its low friction, low density, high temperature resistance and low generation of static electricity so that it does not attract dirt. However, other materials can also be used such as a nylon or a polycarbonate. The latter materials are of a much lower density than polytetrafluorethylene, about 0.9g per c.c. as compared with about 1.7g per c.c. for the poytetrafluorethylene, but the other advantages compensate for this disadvantage. Although the frame described employs flat frame members with straight axles it will be apparent that slightly curved frame members and axles, concave toward the tube, could also be employed.

I claim:

1. A collapsing frame for collapsing a tube of plastic material from a tubular circular cross-section to a flattened form, the collapsing frame comprising:

two frame members each adapted to be disposed on a diametrically opposite side of the tube and converging toward one another in the direction of movement of the tube so as to collapse the tube upon movement of the tube in said direction of movement and engagement of the tube with the frame members, each frame member having mounted thereon for engagement with the tube a plurality of parallel rollers mounted for free rotation about parallel axes that are perpendicular to the direction of tube movement, the width of said parallel rollers increasing progressively and symmetrically about a centre line in said direction of tube movement, so as to progressively contact a larger surface portion of the tube as it moves between the converging frame and guide the tube until its width is defined by the width of the frame, each rollers comprising a plurality of independently rotatable rollers mounted side-by-side with one another to provide a substantially continuous surface of engagement with the tube, said independently rotatable rollers constituting means effective to permit said tube to have different speeds in the direction of movement of said tube and being of a material so as to provide a minimal coefficient of friction with said tube.

2. A collapsing frame as claimed in claim 1, wherein the said frame members are flat and the rollers of each row are all mounted on a common axle.

3. A collapsing frame as claimed in claim 1, wherein the rollers are of diameter in the range 12.5 mm to 25 mm and are of length in the range 12 mm to 5 cm.

4. A collapsing frame as claimed in claim 3, wherein the rollers are of polytetrafluorethylene or nylon material.

5. A collapsing frame as claimed in claim 3, wherein the rollers are of a material of density from about 0.9g per c.c. to about 1.7g per c.c.

* * * * *